(12) United States Patent
Kummer et al.

(10) Patent No.: US 7,411,129 B2
(45) Date of Patent: Aug. 12, 2008

(54) ELECTRICAL CABLE HAVING A SURFACE WITH REDUCED COEFFICIENT OF FRICTION

(75) Inventors: Randy D. Kummer, Villa Rica, GA (US); David Reece, Carrollton, GA (US); Mark D. Dixon, Carrollton, GA (US); John R. Carlson, Newnan, GA (US); Hai Lam, Douglasville, GA (US); Philip Sasse, Douglasville, GA (US)

(73) Assignee: Southwire Company, Carrollton, GA (US)

( * ) Notice: Subject to any disclaimer, the term of this patent is extended or adjusted under 35 U.S.C. 154(b) by 78 days.

(21) Appl. No.: 10/952,294

(22) Filed: Sep. 28, 2004

(65) Prior Publication Data

US 2006/0065427 A1 Mar. 30, 2006

(51) Int. Cl.
*H01B 7/00* (2006.01)

(52) U.S. Cl. .............. 174/110 R; 174/120 R; 427/118

(58) Field of Classification Search .......... 174/110 R, 174/110 FC, 110 S, 120 R, 121 SR; 29/825; 156/52, 53; 427/118, 424, 426, 384
See application file for complete search history.

(56) References Cited

U.S. PATENT DOCUMENTS

| | | | |
|---|---|---|---|
| 2,685,707 A | | 8/1954 | Llewllyn et al. |
| 3,064,073 A | * | 11/1962 | Downing et al. ......... 174/110 F |
| 3,106,981 A | | 10/1963 | Clark et al. |
| 3,108,981 A | * | 10/1963 | Clark et al. ................. 524/232 |
| 3,668,175 A | * | 6/1972 | Sattler ........................ 524/176 |
| 3,852,875 A | * | 12/1974 | McAmis et al. ............ 29/527.4 |
| 3,868,436 A | * | 2/1975 | Ootsuji et al. .............. 264/40.6 |
| 4,002,797 A | | 1/1977 | Hacker et al. |
| 4,057,956 A | | 11/1977 | Tolle ........................... 57/164 |
| 4,137,623 A | | 2/1979 | Taylor |
| 4,274,509 A | | 6/1981 | Thomson et al. |
| 4,275,096 A | | 6/1981 | Taylor |
| 4,356,139 A | * | 10/1982 | Rowland et al. ....... 264/171.19 |
| 4,360,492 A | * | 11/1982 | Rowland et al. ........... 264/40.1 |

(Continued)

FOREIGN PATENT DOCUMENTS

DE 44 10 456 3/1994

(Continued)

OTHER PUBLICATIONS

U.S. Appl. No. 60/544,224, filed Feb. 12, 2004, Carlson et al.

(Continued)

*Primary Examiner*—William H Mayo, III
(74) *Attorney, Agent, or Firm*—Kenneth R. Glaser; Gardere Wynne Sewell, LLP

(57) ABSTRACT

The present invention includes a cable having reduced surface friction and the method of manufacture thereof having steps in which a conductor wire is coated with a mixture of a plastic material and lubricating material and in which the coated conductor wire is cooled. The cable includes at least one conductor core and at least one coating of plastic material and incorporates a lubricating material in and/or on the plastic material. The equipment for the manufacturing of electrical cable includes a reel for supplying a conductor wire to an extruding head, which is connected to tanks containing plastic material and lubricating material for coating the conducting wire, and a reel for taking up the cable.

8 Claims, 3 Drawing Sheets

U.S. PATENT DOCUMENTS

| | | | |
|---|---|---|---|
| 4,522,733 A | | 6/1985 | Jonnes |
| 4,569,420 A | | 2/1986 | Pickett et al. |
| 4,684,214 A | | 8/1987 | Goldmann et al. |
| 4,693,936 A | | 9/1987 | McGregor et al. |
| 4,749,059 A | | 6/1988 | Jonnes et al. |
| 4,806,425 A | | 2/1989 | Chu-Ba |
| 4,965,249 A | * | 10/1990 | De With et al. ............. 505/430 |
| 5,036,121 A | * | 7/1991 | Coaker et al. ............... 524/100 |
| 5,225,635 A | | 7/1993 | Wake et al. |
| 5,565,242 A | | 10/1996 | Buttrick, Jr. et al. |
| 5,614,482 A | | 3/1997 | Baker et al. |
| 5,656,371 A | * | 8/1997 | Kawahigashi et al. ....... 428/375 |
| 5,733,823 A | | 3/1998 | Sugioka et al. |
| 5,753,861 A | * | 5/1998 | Hansen et al. ................. 174/93 |
| 5,912,436 A | * | 6/1999 | Sanchez et al. ......... 174/121 A |
| 6,146,699 A | * | 11/2000 | Bonicel et al. .............. 427/299 |
| 6,159,617 A | * | 12/2000 | Foster et al. ................ 428/523 |
| 6,188,026 B1 | * | 2/2001 | Cope et al. .............. 174/120 R |
| 6,270,849 B1 | | 8/2001 | Popoola et al. ............. 427/404 |
| 6,327,841 B1 | | 12/2001 | Bertini et al. |
| 6,416,813 B1 | * | 7/2002 | Valls Prats .................. 427/118 |
| 6,418,704 B2 | | 7/2002 | Bertini et al. |
| 6,461,730 B1 | | 10/2002 | Bachmann et al. |
| 6,474,057 B2 | | 11/2002 | Bertini et al. |
| 6,534,717 B2 | * | 3/2003 | Suzuki et al. ........... 174/120 R |
| 6,640,533 B2 | | 11/2003 | Bertini et al. |
| 6,903,264 B2 | | 6/2005 | Watanabe et al. |
| 6,906,258 B2 | * | 6/2005 | Hirai et al. ..................... 174/36 |
| 2002/0043391 A1 | * | 4/2002 | Suzuki et al. ........... 174/120 R |
| 2005/0180725 A1 | | 8/2005 | Carlson et al. .............. 385/147 |

FOREIGN PATENT DOCUMENTS

FR    2 674 364 A1    3/1991

OTHER PUBLICATIONS

Mar. 20, 2007 Office Action in U.S. Appl. No. 11/313,596.
Nov. 2, 2005 Office Action in U.S. Appl. No. 11/120,487.
Jun. 8, 2006 Office Action in U.S. Appl. No. 11/120,487.
Dec. 15, 2005 Office Action in U.S. Appl. No. 11/135,807.
Jun. 8 2006 Office Action in U.S. Appl. No. 11/135,807.
Howard & Howard letter to Mr. Thomas C. Wright dated Feb. 7, 2008 re U.S. Appl. No. 11/675,441 (2 pp.).
Dow Corning Product Information sheet re Dow Corning MB50-011 composition, (4pp), attached to Cite No. A.
Dow Corning Product Information sheet re Dow Corning MB50-011 composition, Jan. 15, 2001 (2pp) (http://dowcorning.com).
Dow Corning Product Information sheet re Dow Corning MB25-504 composition, Jan. 2, 2002 (4pp) (http://dowcorning.com).
Dow Corning Product Information sheet re Dow Corning MB40-006 composition, Mar. 4, 2008 (1pp) (http://dowcorning.com).
Dow Corning Product Information sheet re Dow Corning MB50-011 composition, Jan. 15, 2001 (6pp) (http://dowcorning.com).
Dow Corning Product Information sheet re Dow Corning MB50-002 composition, Jan. 15, 2001 (4pp) (http://dowcorning.com).
Dow Corning Product Information sheet re Dow Corning MB50-320 composition, Mar. 4, 2008 (1pp) (http://dowcorning.com).
Dow Corning Product Information sheet re Dow Corning MB50-004 composition, Jan. 15, 2001 (4pp) (http://dowcorning.com).
Dow Corning Product Information sheet re Dow Corning MB50-008 composition, Mar. 4, 2008 (1pp) (http://dowcorning.com).
Dow Corning Product Information sheet re Dow Corning MB50-010 composition, Jan. 16, 2001 (2pp) (http://dowcorning.com).
Dow Corning Product Information sheet re Dow Corning MB50-011 composition, Mar. 4, 2008 (1pp) (http://dowcorning.com).
Dow Corning Product Information sheet re Dow Corning MB50-313 composition, Jan. 15, 2001 (4pp) (http://dowcorning.com).
Dow Corning article "Siloxane additive minimizes friction in fibre optic cable condult", 2001 (2pp) (http://dowcorning.com).
Axel Plastics Research Laboratories, Inc., Product Data Sheet re "Mold Wiz, INT-33PA" (Approx. 2000) (1p).
Axel Plastics Research Laboratories, Inc., Product Data Sheet re "Mold Wiz, INT-40DHT" (Approx. 2001) (1p).
Axel Plastics Research Laboratories, Inc., Product Data Sheet re "Mold Wiz, INT-40GHT" (Approx. 2001) (1p).
E.I. Du Pont de Nemours and Company, Flyer entitled "Teflon", (Aug. 14, 2003) (1p) (http://www.dupont.com).
General Electric Company, Brochure entitled "GE Silicones-Fluids, Emulsions & Specialties", (2001) (19pp).
Witco Corporation, Brochure entitled "Fatty Acids, Glycerine, Triglycerides", (1997) (22pp).
Crompton Corporation, Brochure entitled "Vinyl Additives Product Guide", (2002) (16p).
Dec. 28, 2007 Office Action in U.S. Appl. No. 11/675,441.
Crompton Corporation brochure on Amides (approx. 2003) (27pp).

* cited by examiner

ELECTRICAL CABLE HAVING A SURFACE WITH REDUCED COEFFICIENT OF FRICTION

BACKGROUND OF THE INVENTION

Electrical cables which include at least one conductor core and at least one coating are well known.

Such cables present the disadvantage that their exterior surface has a high coefficient of friction, so that they are awkward to fit in internal sections of walls and ceilings or conduits, since when they come into contact with the surfaces they become stuck or difficult to pull, etc.

In order to overcome said difficulty, alternative materials such as vaselines and the like have been used to coat the exterior surface of the cable, thereby reducing the coefficient of friction.

In a complementary manner, guides of small diameter are sometimes used, one end of which is inserted through the cavity through which the cable has to pass and the other is attached to the end of the cable which must be inserted into the cavity. Thus, once the guide has emerged at the desired place it is pulled until the end of the cable appears again after having passed through the entire section.

In numerous fields of application, and in particular telecommunications, electric or fiber optic cables are inserted into ducts. There is therefore a need to minimize the coefficient of friction between cables and the inside walls of ducts.

In one solution, the core of the cable passes via a first extruder which applies a conventional sheath thereto i.e., a jacket and/or insulation, often made of polyethylene. The sheathed core then passes through a second extruder which applies a lubricant layer thereto, such as an alloy of silicone resin and polyethylene. The cable lubricated in that way then passes in conventional manner through a cooling vessel.

A second solution provides for an extruder to cover the core of a cable with a sheath. At the outlet from that extruder there is disposed a coating chamber for applying granules of material to the still-hot sheath, which granules are designed to become detached when the cable is inserted in a duct. Finally, the coated cable passes through a cooling vessel.

In both of these two prior solutions, it is necessary to interpose additional equipment between the extruder and the cooling vessel. That gives rise to a major alteration of the manufacturing line.

In addition, the equipment for depositing the lubricant must be very close to the sheath extrusion head since otherwise it is not possible to control the thickness of the sheath properly. In any event, the additional equipment occupies non-negligible space and such an arrangement is not favorable for control over the dimensions of the sheath.

Whatever the prior art method used, the manufacture and/or installation of said cables involves a considerable loss of time and an economic cost, since alternative materials are required.

OBJECTS AND SUMMARY OF THE INVENTION

The present invention thus seeks to provide a method for making a cable having a surface with reduced coefficient of friction that does not significantly alter the geometrical characteristics of the cable and the cable so produced.

The invention thus provides a method for incorporating a lubricant in the sheath of a cable, the sheath being made by means of an extruder and optionally followed by a cooling vessel.

In one embodiment of the present invention, the lubricant material is mixed with the sheath material prior to either material being heated.

In another embodiment of the invention, the lubricant material is heated and mixed with the sheath material prior to the sheath material being heated.

In a further embodiment of the invention, the lubricant material is mixed with the sheath material after both materials have been heated.

In yet another embodiment of the invention, the non-heated lubricant material is mixed with heated sheath material.

As used herein the term sheath means a jacket and/or insulation applied to the core of a cable.

DESCRIPTION OF THE INVENTION

With the method and cable of the invention said disadvantages can be solved, while providing other advantages which will be described below.

The method for the manufacture of electrical cables is characterized in that it includes a step in which a lubricating material is mixed with the sheath material and this mixture is applied to the core of the cable.

A cable with low coefficient of friction is achieved thereby, so that subsequent installation of the same is considerably simplified, since it slides over the surfaces with which it comes into contact.

The step of mixing the lubricating material and the sheath material may be carried out with the lubricating material heated or not and the sheath material heated or not.

The sheath material normally is introduced in pellet form to an extruder which heats and directs the sheath material onto the cable or conductor core. The present invention includes the embodiment of incorporating the lubricating material into the sheath pellets during the formation of the sheath pellets and introducing this mixture of sheath pellets and lubricant material into an extruder, the embodiment of mixing the lubricant material with the sheath pellets and the embodiment of introducing this mixture into the extruder, and introducing the sheath pellets into the extruder and subsequently introducing the lubricating material into the extruder prior to contacting the cable core.

Advantageously, the lubricant material is selected from the group consisting essentially of fatty amides, hydrocarbon oils, fluorinated organic resins, and mixtures thereof. The lubricant material may be incorporated at any point in the manufacturing process before the formation of the sheath, and depending upon the material, may be heated prior to mixing with the sheath material.

In instances where the sheath material has a high melting or softening temperature, or for other reasons such as processibility, efficiency of the process, etc. the lubricant material may be added to the sheath material as the sheath material is being formed. If the final cable construction is such that there are two or more different sheath materials applied to the cable core, the lubricant material need only be incorporated into the outermost sheath material.

Advantageous fatty amides and metallic fatty acids include, but are not limited to erucamide, oleamide, oleyl palmitamide, stearyl stearamide, stearamide, behenamide, ethylene bisstearamide, ethylene bisoleamide, stearyl erucamide, erucyl stearamide, and the like. Advantageous hydrocarbon oils include, but are not limited to, mineral oil, silicone oil, and the like. Lubricating materials suitable for the present invention further include plasticizers, dibasic esters, silicones, anti-static amines, organic amines, ethanolamides, mono-and di-glyceride fatty amines, ethoxylated fatty amines, fatty acids, zinc stearate, stearic acids, palmitic acids, calcium stearate, lead stearate, sulfates such as zinc sulfate, etc., and the like. The above lubricating materials may be used individually or in combination.

Suitable lubricating materials include fluorinated organic resins, such as a polymer of one or more fluorinated monomers selected from tetrafluoroethylene, vinylidene fluoride, chlorotrifluoroethylene and the like. The fluorinated resin is preferably used in the form of a powder, emulsion or aqueous dispersion.

The electrical cable is characterized in that it incorporates a lubricating material in the sheath coating, which lubricating material blooms, migrates toward the exterior, or permeates the cable sheath. If desired the sheath material may be somewhat porous, thereby resulting in the lubricating material more readily migrating toward the exterior surface of the sheath.

The sheath of the cable thus contains sufficient lubricating material to provide an exterior surface with reduced coefficient of friction.

The equipment for the manufacturing of electrical cables is characterized in that it may include a device for the incorporation of a lubricating material into the sheath material prior to application to the cable core.

Said equipment may also include a tank to maintain the lubricating material, a section for mixing the lubricating material and sheath material and a section for applying the mixture to the cable core.

Moreover, the equipment may also include a pressure adjusting valve(s), a level indicator(s) of the lubricating material tank and sheath material tanks, and a pressure gauge(s).

BRIEF DESCRIPTION OF THE DRAWINGS

For a better understanding of the present invention, a drawing is attached in which, schematically and by way of example, an embodiment is shown.

In said drawing.

DESCRIPTION OF A PREFERRED EMBODIMENT

Figure 1:
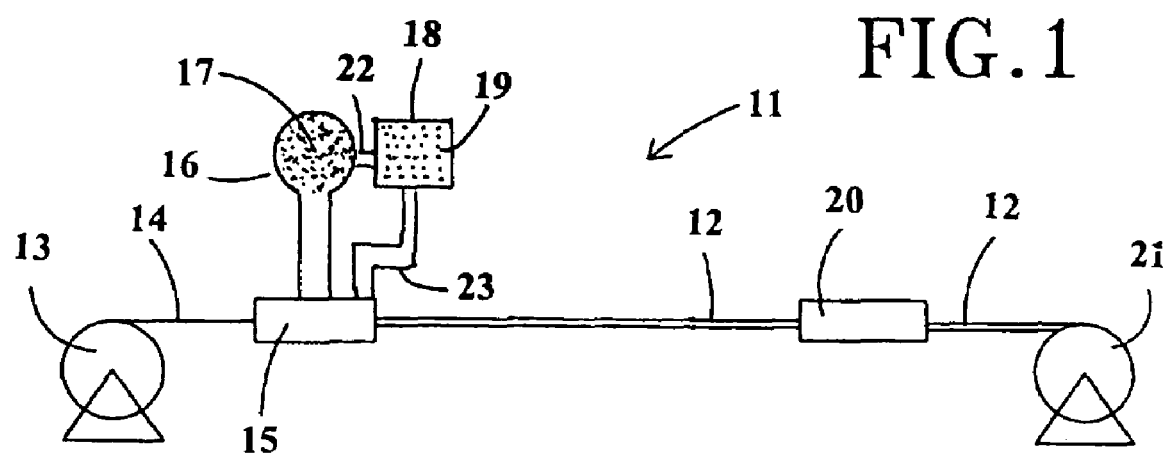
FIG. 1 is a schematic elevation view of equipment for manufacturing electrical cable, according to the method of the present invention.

As can be appreciated in FIG. 1, the equipment 11 for manufacturing electrical cable 12 of the present invention includes a reel 13 which supplies conductor wire 14 to an extruding head 15, which in turn includes a tank 16 of plastic material 17; a tank 18 of lubricating material 19 for mixture with plastic material 17 and for application onto the exterior surface of the conductor wire 14; a cooling box 20 for cooling the exterior surface of the plastic material 17—lubricating material 19 mixture which is in a state of fusion or semi-fusion on the conductor wire or cable core 14; and a reel 21 for taking up the resulting cable 12.

As can also be seen in FIG. 1, the tank 18 may include a section 22 through which the lubricating material can pass into tank 16 and be mixed with plastic material 17 and a section 23 through which lubricating material 19 can be introduced directly into extruding head 15 at a point after plastic material 17 has been introduced into extruding head 15.

Plastic material 17 includes known materials used in electrical wire and cable products such as polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

The present inventive method and the novel cable produced thereby includes the step of coating conductor wire or cable core 14 with the mixture of plastic material 17 and lubricating material 19 and optionally cooling the coated cable formed thereby.

Cable 12 is thus obtained with at least one conducting core and an exterior coating, the main characteristic of which is that its coefficient of friction is low, which makes it easier to install since it slips on the surfaces with which it comes into contact.

Another beneficial property gained by the present invention is an increased resistance to "burn-through." "Burn-through," or "pull-by," results from friction generated by pulling one cable over another during installation, causing deterioration and eventual destruction to its own jacket as well as the jacket of the other cable. When using a lubricated cable of this invention the number of six-inch-stroke cycles required to produce burn-through was increased from 100 to 300.

The present inventive cable may also enhance ease in stripping the jacket from the cable end—termed stripability.

A further benefit of the present invention is the reduction of jacket rippling. Jacket rippling results from the friction of the jacket against building materials, causing the jacket material to stretch and bunch. Jacket damage may result. Installation situations, which repeatedly caused jacket rippling in unlubricated cable caused no rippling in lubricated cable jackets.

Despite the fact that reference has been made to specific embodiments of the invention, it will be clear to experts in the subject that the cable, the method and the equipment described can be varied and modified in many ways, and that all the details mentioned can be replaced by others which are technically equivalent without departing from the sphere of protection defined by the attached claims.

For example, cable 12 on which plastic material 17 and lubricating material 19 are applied can be of any desired configuration and can be an optical fiber cable or the like.

It has been found experimentally that the use of a lubricating material disclosed herein is suitable for providing a considerable reduction of the coefficient of friction of the cable, which means that it is easier to install without adding any external element to it, which is one of the objectives sought in the present invention.

EXAMPLE

To understand the effects of the jacket lubricant system on the ease of pull, variations of the UL (Underwriters Laboratories, Inc.) joist pull test were utilized.

The joist pull test outlined in UL719 Section 23 establishes the integrity of the outer PVC jacket of Type NM-B constructions when subjected to pulling through angled holes drilled through wood blocks.

Figure 2:
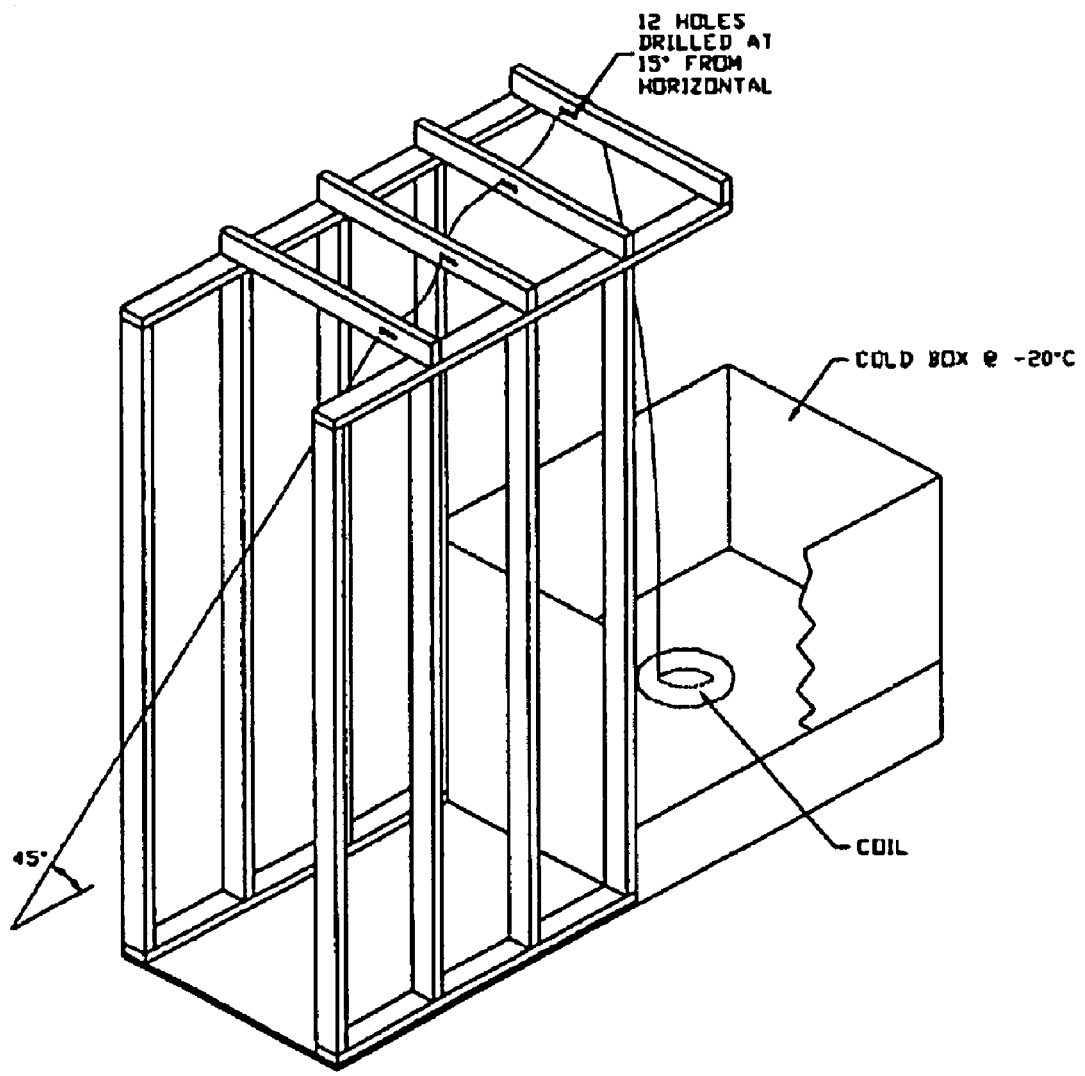
FIG. 2 is a diagram illustrating a first type of joist-pull test apparatus used to characterize the present invention.

The first variation of the test apparatus (see FIG. 2) consists of an arrangement of 2"×4" wood blocks having holes drilled at 15° drilled through the broad face. Four of these blocks are then secured into an frame so that the centerlines of the holes are offset 10" to create tension in the specimen through the blocks. A coil of NM-B is placed into a cold-box and is conditioned at −20° C. for 24 hours. A section of the cable is fed through corresponding holes in the blocks where the end protruding out of the last block is pulled through at 45° to the horizontal. The cable is then cut off and two other specimens are pulled through from the coil in the cold-box. Specimens that do not exhibit torn or broken jackets and maintain conductor spacing as set fort in the Standard are said to comply.

Pulling wire through the wood blocks provides a more direct correlation of the amount of force required to pull NM-B in during installation. Because of this relationship, the rate of the pulling so that more data points could be obtained. Holes were drilled in rafters whereby specimens could be pulled by the winch.

It was found using this method that lubricated specimens yielded approximately a 50% reduction in pulling force when compared to standard, non-lubricated NM-B specimens. The results are shown in Tables 1 and 2 wherein the data was recorded at five second intervals.

TABLE 1

| Test Pt. Descr. | Specimen Description | | | | | | | | |
|---|---|---|---|---|---|---|---|---|---|
| | Manufacturer A1 | Manufacturer A2 | Manufacturer A3 | Manufacturer B1 | Manufacturer B2 | Manufacturer B3 | Control 1 | Control 2 | Present Invention |
| 1st Point | 26.8 | 48.3 | | 37.8 | 37.4 | | 16.5 | 41.9 | 24 |
| 2nd Point | 34.6 | 51.1 | | 35.2 | 38.1 | | 41.6 | 42 | 20.5 |
| 3rd Point | 33.7 | 46.8 | | 32 | 33 | | 40.2 | 38.7 | 20 |
| 4th Point | 38.6 | 49.8 | | 34.7 | 34.6 | | 41.3 | 29.5 | 17.4 |
| 5th Point | 33.1 | 44.8 | | 34.2 | 32.5 | | 41.3 | 34.3 | 20.2 |
| 6th Point | 28.6 | 44.7 | | 32.2 | 33.2 | | 42.5 | 35.9 | 15.8 |
| 7th Point | 5.5 | 51 | | 32.2 | 33.9 | | 41.1 | 37 | 17.2 |
| 8th Point | 26.8 | 49.2 | | 33.9 | 33 | | 40.9 | 38.4 | 17.3 |
| 9th Point | 21.9 | 52.5 | | 32.6 | 30.6 | | 42.7 | 37.3 | 21.9 |
| Average | 30.51 | 48.69 | | 33.87 | 34.03 | | 41.45 | 37.22 | 19.37 |

AAA - Denotes Outlyers
Test in Table 1 performed at a constant speed with winch using ½ speed pulley
Test in Table 2 performed on cable with a 5# weight suspended at building entry
Std. Prod.

| Average | Present Invention |
|---|---|
| 37.6289 | 19.37 |

TABLE 2

| Test pt. Descr. | Specimen Description | | | | | | |
|---|---|---|---|---|---|---|---|
| | Manufacturer A 14-2 | Manufacturer B 14-2 | Control 1 14-2/12-2 | Control 2 14-2/12-2 | Control 3 14-2/12-2 | Invention A 14-2/12-2 | Invention B 14-2/12-2 |
| 1st Point | 34 | 32.6 | 50 | 47.5 | 40.2 | 21.5 | 12.3 |
| 2nd Point | 35 | 35.7 | 50.6 | 38.3 | 37.5 | 22.9 | 12.8 |
| 3rd Point | 35.5 | 31.2 | 46.7 | 43.2 | 27.5 | 29 | 12.1 |
| 4th Point | 37.7 | 35 | 44.5 | 46 | 36.8 | 22.4 | 14.9 |
| 5th Point | 40.5 | 30.6 | 46.2 | 39.5 | 36 | 23.3 | 11.9 |
| 6th Point | 32.9 | 28.8 | 40.9 | 35.7 | 41.2 | 21.1 | 12.5 |
| 7th Point | 44.2 | 32.4 | 52.8 | 37.5 | 37 | 21.6 | 11.7 |
| 8th Point | 43 | 32.4 | 40.7 | 27.7 | 31.7 | 22.5 | 11.7 |
| 9th Point | 43.4 | 30.5 | 40 | 31.1 | | 19.2 | 11 |
| 10th Point | 40 | | | | | | 11.6 |
| Average | 38.62 | 32.13 | 45.82 | 38.50 | 35.99 | 22.61 | 12.25 |

14-2/12-2 Control Avg. 40.103241
14-2/12-2 Invention A 22.61
14-2/12-2 Invention B 12.25 joist-pull test is initially the basis for which ease of pulling is measured, but a test for quantifying this "ease" into quantifiable data had to be established.

Figure 3:
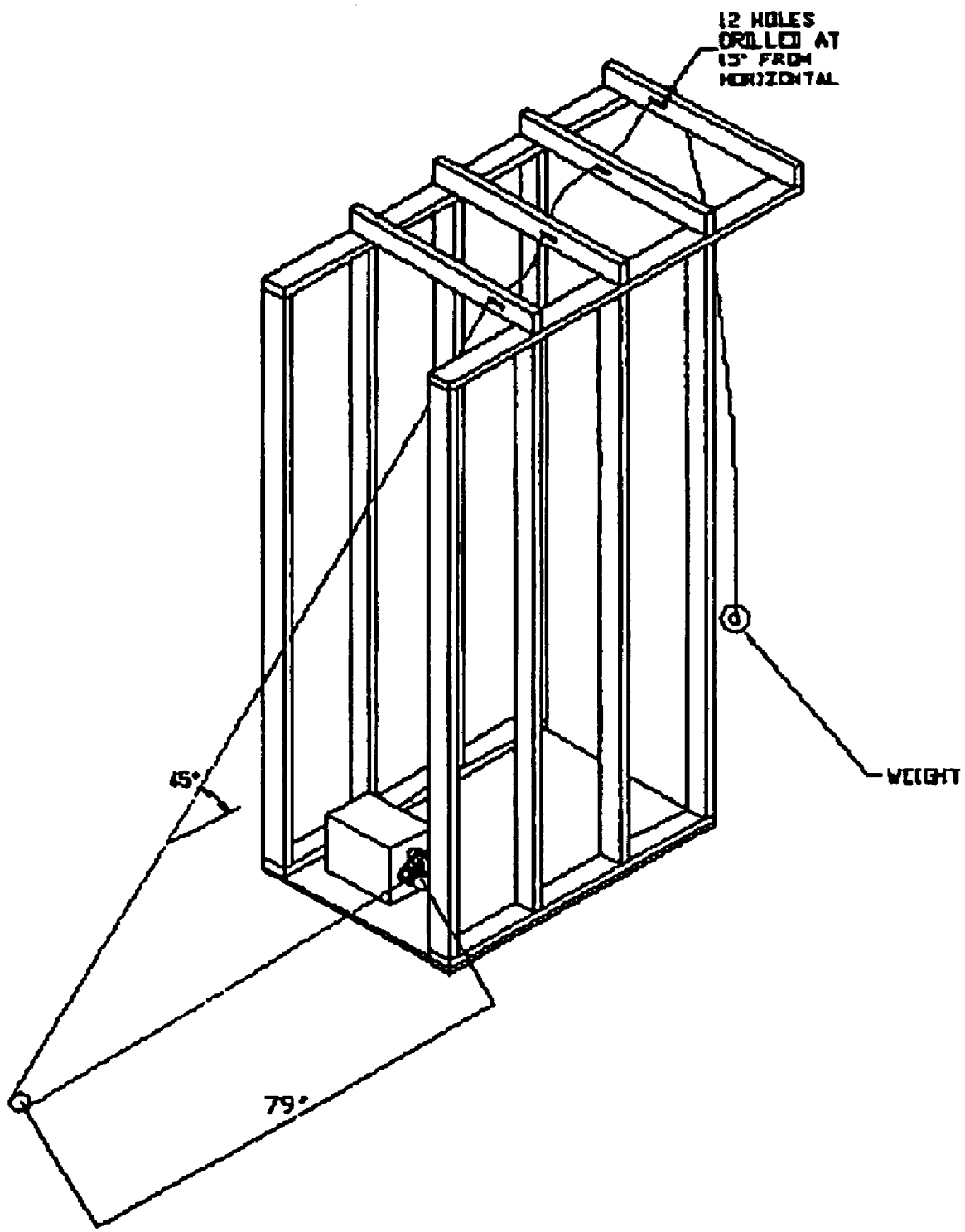
FIG. 3 is a diagram illustrating a modified type of joist-pull test apparatus used to characterize the present invention.

Accordingly, and as shown in FIG. 3, a variable-speed device was introduced to pull the cable specimen through the blocks. An electro-mechanical scale was installed between the specimen and the pulling device to provide a readout of the amount of force in the specimen. To create back tension a mass of known weight (5-lbs) was tied to the end of the specimen.

Data recorded proved that NM-B constructions having surface lubricates reduced pulling forces.

A 12-V constant speed winch having a steel cable and turning sheave was employed; the turning sheave maintains a 45 degree pulling angle and provides a half-speed to slow the

What is claimed is:

1. In a method of manufacturing a finished electrical cable having a conductor core and a sheath of material surrounding at least said conductor core and defining the outermost exterior surface of the finished cable, the improvement comprising:

(a) introducing sufficient lubricant into said material prior to the formation of said sheath to provide a reduced coefficient of friction of said outermost exterior surface and reduce the amount of force required to pull the cable during its installation, in which said lubricant is of the type which either migrates through, or permeates, said material to be available at said outermost exterior surface; and (b) thereafter extruding said so-lubricated material to surround at least said conductor core.

2. The improvement as defined in claim 1, in which the introduction of said lubricant into said material is effected by combining said material in non-pellet form with said lubricant, thereby to form sufficiently lubricated material pellets, and the so-lubricated material pellets are thereafter used for said extruding.

3. The improvement as defined by claim 1, in which the introduction of said lubricant into said material is effected by injecting the said material in non-lubricated form into an extruding head at a first location and injecting the said lubricant into said extruding head at a second location downstream from said first location.

4. A method of manufacturing a finished electrical cable having a conductor core and an outermost sheath of thermoplastic material surrounding at least the conductor core and defining the exterior surface of the finished cable, said method comprising:
   (a) providing a supply of thermoplastic material;
   (b) introducing sufficient lubricant into said thermoplastic material to provide a reduced coefficient of friction of said exterior surface of said outermost sheath at the time of the installation of the finished cable through passageways of building structures, said lubricant being of a type which either migrates through, or permeates, the thermoplastic material, to be available at said exterior surface of the cable at the time of its installation;
   (c) extruding the so-lubricated thermoplastic material to surround at least the conductor core; and
   (d) thereafter cooling the extruded material to form the said outermost sheath, the lubricant remaining within said sheath after said cooling.

5. The method as recited in claim 4, in which the lubricant only migrates through the thermoplastic material to reach the said exterior surface of the cable at the time of its installation.

6. A method of manufacturing a finished electrical cable of the type having a conductor core, and at least two sheaths surrounding at least the conductor core, an inner sheath of a first material, and an outermost sheath of a second material different than said first material, the outermost sheath defining the exterior surface of the finished cable, said method comprising:
   (a) forming said inner sheath of said first material;
   (b) introducing a lubricant into the said second material sufficient to provide a reduced coefficient of friction of the exterior surface of said outermost sheath and reduce the amount of force required to pull the cable during its installation, said lubricant being of a type which either migrates through, or permeates, said second material, to be available at said exterior surface of the cable at the time of its installation;
   (c) extruding said so-lubricated material to surround at least said conductor core; and
   (d) thereafter cooling said extruded material to form said outermost sheath.

7. The method of manufacture as defined by claim 6 in which the lubricant is chosen only to migrate through said second material to reach the said exterior surface at the time of the installation of the finished cable.

8. A method of manufacturing a finished electrical cable of the type having a conductor core, and at least two sheaths surrounding at least the conductor core, an inner sheath of a first material, and an outermost sheath of a second material different than said first material, the outermost sheath defining the exterior surface of the finished cable, said method comprising:
   (a) forming said inner sheath of said first material;
   (b) introducing a lubricant into the said second material sufficient to provide a reduced coefficient of friction of the exterior surface of said outermost sheath at the time of installation of the finished cable, thereby to reduce the amount of force required to pull the cable and increase the resistance to cable burn-through during its installation, said lubricant being of a type which either migrates through, or permeates, said second material, to be available at said exterior surface of the cable at the time of its installation; and
   (c) extruding said so-lubricated material to surround at least said conductor core, therein providing said finished cable with a lubricated outer surface at the time of installation without the external application of a lubricant to said outer surface.

* * * * *